United States Patent [19]

Blake

[11] Patent Number: 5,251,911

[45] Date of Patent: Oct. 12, 1993

[54] SAFETY CONSTRUCTION FOR PASSENGER VEHICLE

[76] Inventor: Carlton E. Blake, 6442 Sienna Ct., Falls Church, Va. 22043

[21] Appl. No.: 988,326

[22] Filed: Dec. 9, 1992

[51] Int. Cl.$^5$ .............................................. B62D 27/04
[52] U.S. Cl. .................................... 296/35.1; 180/274; 280/784
[58] Field of Search .......................... 296/35.2, 68.1; 280/784; 180/274

[56] References Cited

U.S. PATENT DOCUMENTS

| | | | |
|---|---|---|---|
| 3,423,124 | 1/1969 | Hewitt | 296/68.1 |
| 3,508,783 | 4/1970 | Schlanger | 296/35.2 |
| 3,743,347 | 7/1973 | Shaw | 296/35.1 |
| 3,831,998 | 8/1974 | Hewitt | 296/35.2 |
| 3,837,422 | 9/1974 | Schanger | 296/35.2 X |

Primary Examiner—Robert R. Song
Attorney, Agent, or Firm—Joseph J. Baker

[57] ABSTRACT

A safety construction for a passenger vehicle having a fixed body portion secured to a chassis and a separable body portion comprising a passenger compartment with a platform secured to the chassis by a resilient release system. The release system includes a plurality of spring means and frangible fastener means adapted to keep the platform in engagement with the chassis until caused to separate upon application of a predetermined shear force.

4 Claims, 2 Drawing Sheets

SAFETY CONSTRUCTION FOR PASSENGER VEHICLE

BACKGROUND OF THE INVENTION

This invention relates to a safety construction for passenger vehicles and more specifically to a vehicle design intended to protect the occupants of a vehicle upon collision with an external obstruction.

Various safety devices have been employed over the years to reduce injury to occupants when the vehicle in which they are riding is involved in a collision, be it with another vehicle traveling at a high rate of speed or a fixed external obstruction. These devices include shock absorbing bumpers, padded dashboards, collapsible steering columns, seat belts, and air bags.

Regrettably, these safety devices have been effective only to a limited degree and usually only if the collision takes place at relatively slow speeds and the sudden deceleration therefrom is minimal. However, if the vehicle is subjected to substantially instantaneous deceleration to zero velocity, the occupants are propelled forward at a velocity approximately equal to that which the vehicle was travelling prior to impact, these aforementioned safety devices have been effective only to a limited degree. It is well known that during a collision, the components adjacent the area of the vehicle struck absorb the kinetic energy of the vehicle, and the kinetic energy of the driver and passengers must be absorbed by other means to prevent their collision with the windshield, dashboard or other objects within the vehicle compartment. Air bags used in combination with seat belts have proved to be the most satisfactory devices so far for decelerating an occupant, however, air bags are only available to the front seat passengers, usually the driver, and not to the rear seat passengers.

The use of separable passenger compartments is not new. U.S. Pat. Nos. 2,929,637, 3,162,479, 3,695,629, 3,831,998 and 3,837,422 all disclose passenger compartments which move relative to the remainder of the vehicle upon collision with an external obstruction. However, the complexity of the various mechanisms used to secure the separable passenger compartment to the vehicle chassis during normal operation and control the movement of the compartment after impact would result in an unacceptable increase in the cost of the vehicle and decrease in the reliability of the mechanism which usually occurs as the number of movable parts increases.

The present invention is an improvement over the conventional devices set forth in the above-referenced U.S. patents by providing an improved separable passenger compartment and a means of effectively securing the compartment to the vehicle chassis during normal operation of the vehicle, yet which will absorb a great amount of the kinetic energy prior to its effect on the passengers and operation of the vehicle, yet which will permit a degree of movement of the compartment in proportion to the amount of force generated during a collision.

It is therefore the primary object of the present invention to provide an improved safety vehicle having a separable passenger compartment which is automatically displaced upon impact of the vehicle with an external obstruction.

It is another object of the present invention to provide an improved safety vehicle in which the separable passenger compartment is secured to the chassis by a novel, kinetic energy absorbing means.

It is still another object of the present invention to provide an improved safety vehicle which is simple in design, economical in production and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings wherein similar characters of reference denote similar elements in each of the several views.

DETAILED DESCRIPTION

Figure 1:
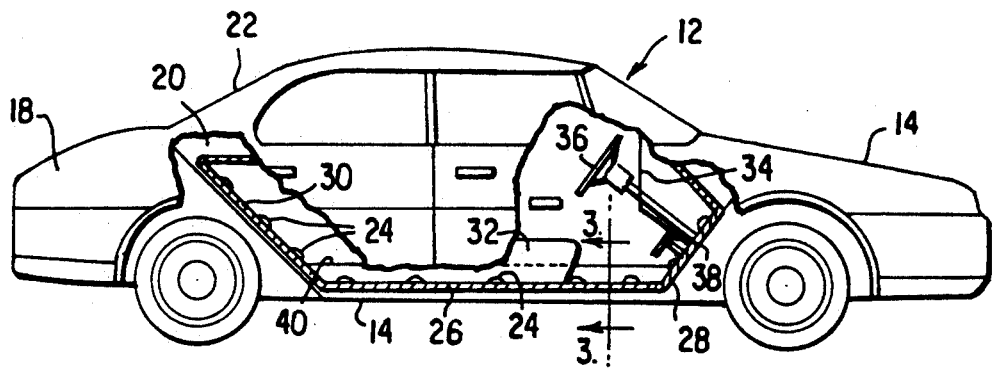
FIG. 1 is a side view, partly in cross section of the vehicle according to the present invention.

Referring to FIG. 1, the safety vehicle 12 includes a chassis 14 with a front end 16 having, typically, a hood, engine, headlights, grill and other elements of a conventional automobile. The rear end 18 of the chassis 14 includes a trunk, spare tire, etc. Intermediate the front and rear ends of the chassis 14 is an open space 20, which lies generally longitudinally of the chassis 14. A passenger compartment 22 is separably mounted within the open space 20 and is secured therein by a resilient release system 24 to be more fully described later. The compartment 22 comprises a platform 26 having a tapered forward section 28 and a tapered rear section 30. The platform 26 is preferably constructed of reinforced, heavy gauge sheet metal at least several times as thick as the sheet metal forming the chassis 14. The compartment 22 also includes a top, doors and windows forming, with the platform 26, a complete, enclosed capsule around the vehicle passenger(s). Seats 32 are mounted on the platform, as is the dashboard 34. The steering wheel 36 and brake pedals 38, as well as other necessary control elements which extend through the forward section 28, are provided with quick detachable connecting means (not shown) to permit the passenger compartment 22 to release entirely from the chassis 14 in the event of a severe impact, as will also be more fully explained later. A channel 40 would be provided in the bottom of the platform 26 to fit over the drive shaft hump normally present in the chassis of vehicles with rear drive wheels. When the passenger compartment 26 is positioned within the open space of the chassis 14, the vehicle exterior contours are continuous and the vehicle appears to be of conventional construction.

Figure 2:
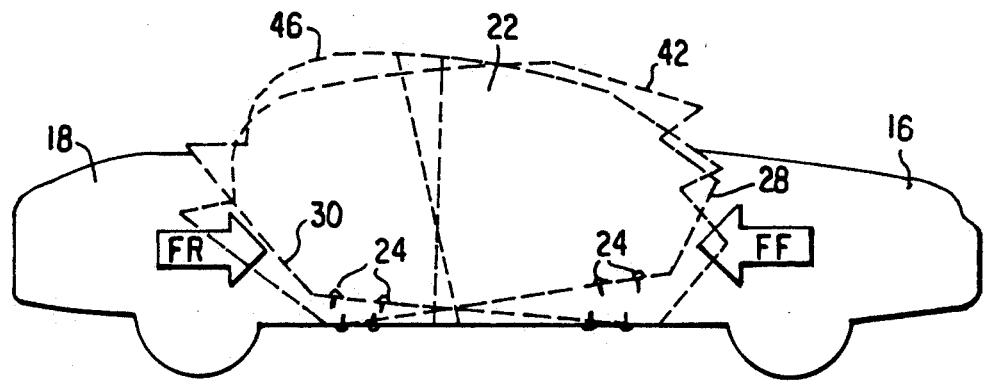
FIG. 2 is a side view partly in schematic form of the separable passenger compartment relative to the chassis after impact.

As shown in FIG. 2, if the vehicle 12 encounters an external obstruction against front end 16 such as a tree or other vehicle (not shown) when travelling at high speed, the kinetic energy absorbed by the front end 16 which includes the engine, transmission, etc. is directed as a force rearward and is schematically represented by arrow FF. The force FF impinges on tapered forward section 28 causing the passenger compartment 22 to travel by cam action vertically as shown in phantom line 42 against the resilient release system 24. If the force FF is large enough, the passenger compartment 22 will be driven vertically relative to the chassis 14 a distance sufficient to cause actuation of the resilient release system 24. The vertical acceleration of the compartment 22 against the force of resilient release system 24 will tend to absorb a considerable amount of the kinetic energy present, thereby acting to decelerate the movement of the passengers forward within the compartment. Similarly, if a force FR impinges the tapered rear section 30 also causing the passenger compartment 22 to travel vertically as shown by phantom line 46, the resilient release system 24 will act to dissipate kinetic energy to thereby decelerate the rearward movement of passengers in the compartment 22.

Figure 3:
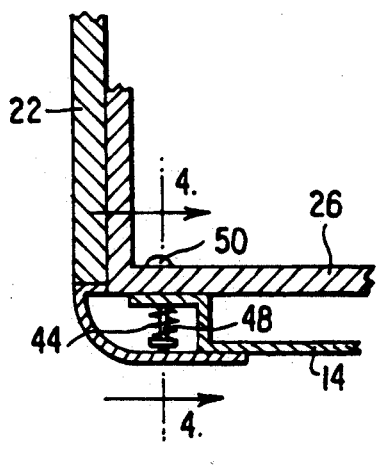
FIG. 3 is a cross-sectional view taken along lines 3—3 of FIG. 1.
Figure 4:
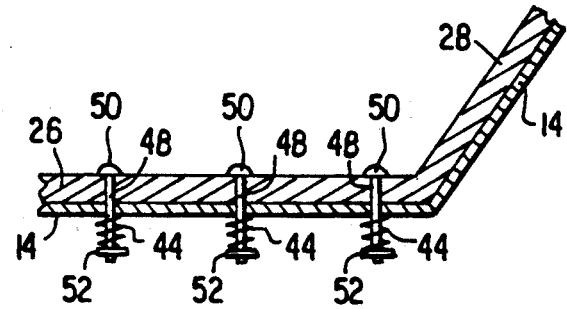
FIG. 4 is a cross-sectional view taken along the lines 4—4 of FIG. 3.
Figure 5:
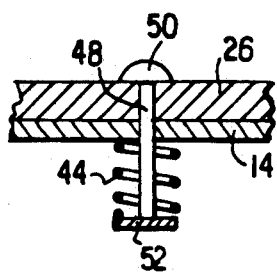
FIG. 5 is an enlarged cross-sectional view of the novel release system.

As shown in FIGS. 3, 4 and 5, the platform 26 of the passenger compartment 22 is secured to the chassis 14 of the vehicle 12 by means of a plurality of resilient release systems 24 on each side of the vehicle. Each release system 24 consists of a compression-type, coil spring 44 concentrically positioned on a mounting rod 48. The specific elasticity of the spring 44 as well as its length and the number employed is chosen so as to absorb a sufficient amount of the kinetic energy transmitted to the platform 26 and passenger compartment 22 during a collision to thereby materially reduce the kinetic energy imparted to the passengers within the compartment 22 to thereby prevent or at least reduce the chance of serious injury by collision with the interior of the compartment. The resilient release systems 24 are located principally in the area beneath the doors of the compartment 22 between the platform 26 and the chassis 14.

The end of the mounting rod 44 is secured to the platform 26 by, for example, a weldment 50. Other means (not shown) could be a threaded end on the mounting rod 48 for mating with a threaded aperture in the platform 26, a threaded nut on the threaded end of the rod 48 or other fastening method. A disc or plate 52 secured to, or integrally formed with, the other end of mounting rod 48 maintains the coil spring 44 on the mounting rod and keeps it adjacent the underside of the chassis 14. In one embodiment, the disc 52 is chosen so that its resistance to separation or fracture from the rod 48 due to a shear force is overcome in a severe collision and only after the coil springs 44 have absorbed all of the kinetic energy they are capable of. In another embodiment, the mounting rod 48 or weldment 50 could themselves be frangible rather than disc 52. It may also be desirable to include a number of resilient release systems 24 between the platform 26 and chassis 14 in the area of the front and rear tapered sections 28, 30, respectively, if added kinetic energy absorption means is necessary or desirable from the standpoint of collisions occurring adjacent the side of the doors of the compartment 22.

Figure 6:
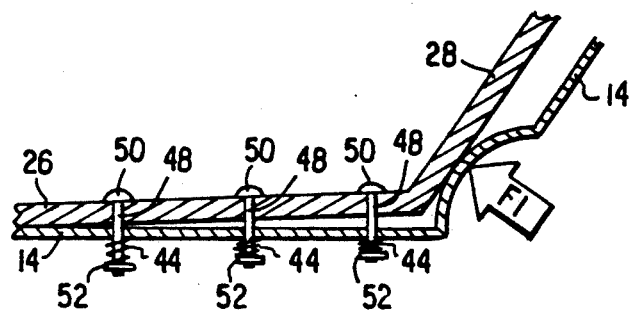
FIG. 6 is the cross-sectional view of FIG. 4 depicting a relatively minor impact against the passenger compartment.
Figure 7:
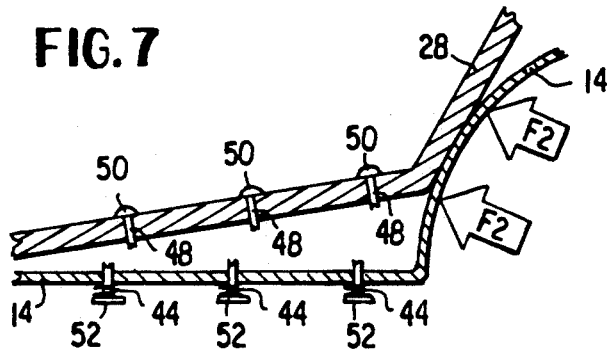
FIG. 7 is the cross-sectional view of FIG. 5 depicting a severe impact against the passenger compartment.
Figure 8:
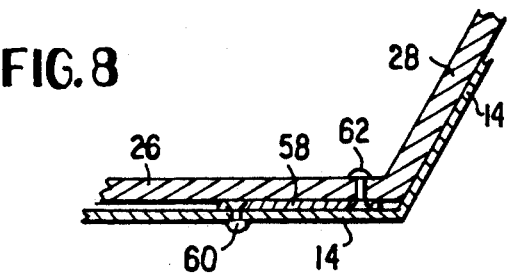
FIG. 8 is a view in cross-section of another embodiment of the present invention.
Figure 9:
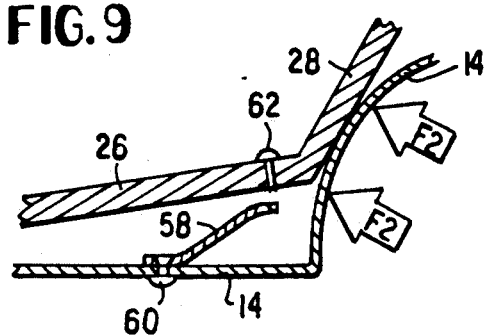
FIG. 9 is a view in cross-section of the embodiment of FIG. 7 depicting a severe impact against the passenger compartment.

Referring to FIGS. 5, 6 and 7, operation of the safety construction of the present invention will be described. If a force F1 of a magnitude that would result from an approximately 10-30 mph collision were directed as shown in FIG. 6 against the tapered forward section 28 of chassis 14 by say the kinetic energy of the vehicle engine, the platform 26 would tend to be cammed a distance vertically with respect to the chassis 14. Such a force F1 would cause a number of the coil springs 44 to compress, thereby absorbing a large portion of the kinetic energy of the platform 26 and attached compartment 22, thus reducing the kinetic energy of the passengers before returning the compartment to its initial position. If, however, the force is of a much greater magnitude, shown at F2 in FIG. 7, which would result from a frontal collision, for example, above 30 mph, the platform 26 would be cammed vertically to a much greater degree, thereby causing frangible mounting rod 48 or frangible weldment 50 to break away or shear, thus permitting the compartment 22 and passengers therein to be raised vertically to a safe level. The components of the vehicle, such as the engine, etc., are then caused to plow under the platform 26 where their kinetic energy is dissipated. As aforestated, the required resistance to shearing of mounting rod 48 or the weldment 50 or disc 52, and the resilience of coil spring 44 can be determined by experimentation by one having ordinary skill in that art to achieve deceleration of the passengers in the compartment 22 and a reduction of the inertial effects of a high speed impact.

FIG. 7 shows another embodiment of the invention wherein the release system 24 comprises a leaf-type spring 58 positioned between the chassis 14 and the platform 26. The spring 58 would have one end thereof secured to the chassis 14 by means of a frangible bolt or rivet 60 and secured at the other end to the platform 26 by a similar frangible bolt or rivet 62. During a collision, the leaf spring(s) 58 would flex until the shear point of the bolts 60, 62 is reached whereupon the passenger compartment 22 would separated from the chassis 14.

As can be seen, a safety construction for vehicles has been provided which effectively reduces the forces imposed upon the occupants of the passenger compartment due to moderate to extremely high deceleration rates resulting from a high speed collision with an external object and in effect provides a controlled and gradual deceleration to zero velocity.

While only a few embodiments of the present invention have been shown and described, it will be understood that many changes and modifications may be made thereunto without departing from the spirit and scope of the invention.

What I claim is:

1. In a safety construction for vehicles, the combination comprising:

a) a vehicle having a chassis, a fixed and separable body portion on said chassis and a means of propulsion, said separable body portion comprising a passenger compartment having a platform with passenger seats and detachable controls for operating said vehicle, said platform being of a construction considerably more resistant to damage from impact than the chassis of said vehicle, said compartment being movable from a first position wherein said movable compartment exterior contours are continuous with the exterior contours of the fixed body portion to a position projecting substantially away from the fixed body portion, and b) resilient release means operative between said platform and said chassis for permitting a small degree of relative movement therebetween if a minor force is exerted on said compartment when the vehicle collides with an external obstruction, said resilient release means having frangible fastening means to permit separation of part or all of said compartment relative to said chassis if a major force is exerted on said compartment when said vehicle collides with an external obstruction.

2. A safety construction as set forth in claim 1 wherein said resilient release means comprises a coil-type spring means and said frangible fastening means is a rod operatively connected between said platform and said spring means.

3. A safety construction as set forth in claim 1 wherein said resilient means comprises a flat, leaf-type spring means and said frangible fastening means is a bolt means securing said spring means to said chassis and said platform which will separate upon application of a predetermined shear force.

4. A safety construction as set forth in claim 2 wherein said platform is constructed of reinforced, heavy gauge sheet metal with front and rear portions tapered at an angle relative to the horizontal to force said compartment vertically if said tapered portion is engaged by said fixed portion of said vehicle.

* * * * *